(12) United States Patent
Cattaneo (10) Patent No.: US 11,920,625 B2
(45) Date of Patent: Mar. 5, 2024

(54) SAFETY WASHER FOR IMPROVED CONTROL OF BOLT TENSION AND HIGH ANTILOOSENING EFFECT

(71) Applicant: GROWERMETAL S.p.A., Calco (IT)

(72) Inventor: Paolo Cattaneo, Calco (IT)

(73) Assignee: GROWERMETAL S.p.A., Calco (IT)

( * ) Notice: Subject to any disclaimer, the term of this patent is extended or adjusted under 35 U.S.C. 154(b) by 353 days.

(21) Appl. No.: 17/438,708

(22) PCT Filed: Mar. 11, 2020

(86) PCT No.: PCT/EP2020/056492
§ 371 (c)(1),
(2) Date: Sep. 13, 2021

(87) PCT Pub. No.: WO2020/182875
PCT Pub. Date: Sep. 17, 2020

(65) Prior Publication Data
US 2022/0154758 A1    May 19, 2022

(30) Foreign Application Priority Data

Mar. 13, 2019   (EP) ................................ 19162538

(51) Int. Cl.
*F16B 39/24* (2006.01)
*F16B 39/282* (2006.01)

(52) U.S. Cl.
CPC ............ *F16B 39/24* (2013.01); *F16B 39/282* (2013.01)

(58) Field of Classification Search
CPC ........ F16B 39/10; F16B 39/24; F16B 39/282; F16B 43/00; F16B 43/002

(Continued)

(56) References Cited

U.S. PATENT DOCUMENTS 3,329,190 A * 7/1967 Oldenkott ............... F16B 39/24
411/149
3,417,802 A * 12/1968 Oldenkott ............. F16B 43/009
411/959

(Continued)

FOREIGN PATENT DOCUMENTS

DE     2811108 A1    9/1979
EP     3144547 A1    3/2017

(Continued)

OTHER PUBLICATIONS

International Application No. PCT/EP2020/056492, "International Search Report", dated Jun. 9, 2020, 3 pages.

*Primary Examiner* — Roberta S Delisle
(74) *Attorney, Agent, or Firm* — COZEN O'CONNOR (57) ABSTRACT

The present invention relates to a washer having a having central hole, a bolt under head engaging surface (under head surface) and a bearing engaging surface (bearing surface) with a serration on both surfaces, wherein
the serration on the bolt under head engaging surface comprises a saw tooth structure,
the edges of the saw tooth structure in top view of the bolt under head engaging surface of the washer have a boomerang-like shape,
the bolt under head engaging surface has a chamfer on its inner periphery,
the serration on the bearing engaging surface comprises a plurality of teeth which in top view of the bolt under head engaging surface run in the direction from the inner to the outer circumference of the washer surface and which are inclined with regard to radially extending straight lines originating from the washer center, and (Continued)

the top sections of the edges of both the teeth and the saw tooth structure in cross-sectional view of the serrations are rounded.

15 Claims, 4 Drawing Sheets

(58) Field of Classification Search
USPC ....... 411/132, 136, 147, 160, 161, 163, 531, 411/538
See application file for complete search history.

(56) References Cited

U.S. PATENT DOCUMENTS

| | | | | |
|---|---|---|---|---|
| 4,710,081 A * | 12/1987 | Overhues | ................ | F16B 39/24 411/161 |
| 5,090,855 A * | 2/1992 | Terry | ...................... | F16B 39/24 411/149 |
| 6,776,565 B2 * | 8/2004 | Chang | ................... | F16B 39/282 411/149 |
| 7,128,511 B2 * | 10/2006 | Hewgill | .................. | F16B 39/24 411/533 |
| 9,011,060 B2 * | 4/2015 | Hyatt | .................... | F16B 39/282 411/136 |
| 2006/0216129 A1 * | 9/2006 | Lin | ........................ | F16B 39/282 411/161 |
| 2007/0243040 A1 * | 10/2007 | Chen | ..................... | F16B 39/282 411/161 |
| 2013/0170922 A1 * | 7/2013 | Persson | .................. | B21D 53/22 470/42 |

FOREIGN PATENT DOCUMENTS

| | | |
|---|---|---|
| WO | 2005/024253 A1 | 3/2005 |
| WO | 2018/072562 A1 | 4/2018 |
| WO | 2018/088913 A1 | 5/2018 |

* cited by examiner

SAFETY WASHER FOR IMPROVED CONTROL OF BOLT TENSION AND HIGH ANTILOOSENING EFFECT

The present invention relates to a washer having a serration on both of its surfaces.

Washers are used for example to avoid unwanted loosening of a threaded bolt screwed tightly into a corresponding bearing, which is achieved by inducing a tension to the bolt in the tightened state. The induced tension correlates with the resistance to loosening the bolt from the bearing. The tension is determined by, on the one hand, the friction between the washer and the bolt and, on the other hand, the friction between the washer and the bearing.

In practice, a certain torque is applied to the bolt head which, in turn, should translate into a well-defined tension. This, however, only applies for the case that also the friction between the washer and the surfaces to be engaged with it is well defined.

This is usually the case for the lower side of the bolt head (bolt under head) to be engaged with one surface of the washer, because the material and surface conditions (such as bolt grade and the nature of a coating) of the bolt are well-defined. By contrast, in practice the material (and hence the hardness) and surface of the bearing can vary to a high degree and hence the friction between the other surface of the washer and the bearing can vary to a high degree. This causes the problem that for the same torque applied, the tension induced to the bolt may vary to a considerable degree.

To overcome this problem, washers having a different serration (pattern) on the washer surface to be engaged with a bearing (in the following also denoted as "bearing surface" of the washer) and on the surface to be engaged with the bolt under head (in the following also denoted as "under head surface" of the washer) are known, e.g. from DE 28 11 108 A1.

However, these known constructions do not in all cases guarantee that the washer does not slide on the bearing when the bolt is tightened on the bearing which would be necessary to induce a well-defined tension on the bolt. Furthermore, it is desired to further improve the untightening torque of the bolt/washer/bearing connection and to improve the residual tension on the bolt after vibrational stress induced on the bolt/washer/bearing assembly.

The present invention is based on the finding that a washer overcoming the mentioned disadvantages of the known washers and having the mentioned desired improved properties can be provided if the washer both on its bearing surface and on its under head surface has different, specially designed serrations.

Thus, the present invention provides a washer having a central hole, a bolt under head engaging surface (under head surface) and a bearing engaging surface (bearing surface) with a serration on both surfaces, wherein
the serration on the bolt under head engaging surface comprises a saw tooth structure,
the edges of the saw tooth structure in top view of the bolt under head engaging surface of the washer have a boomerang-like shape with the tip of the boomerangs pointing into the untightening direction of the washer,
the serration on the bearing engaging surface comprises a plurality of teeth 15 which in top view of the bearing engaging surface run in the direction from the inner to the outer circumference of the washer surface and which are inclined with regard to radially extending straight lines originating from the washer center so that the ends of the teeth close to the inner circumference of the washer point into the tightening direction, and
the top sections of both the teeth and the saw teeth in cross-sectional view of the serrations are rounded.

The combination of the features of the washer of the present invention ensures that, on the one hand, the friction between the bearing engaging surface of the washer and the bearing surface is so high that when the screw is tightened, the washer does not move relatively to the bearing but only relative to the bolt head. Thus, the washer during fastening/tightening of the bolt is fixed in its position on the bearing and the washer moves relatively only with regard to the bolt. As a consequence, the friction induced by the torque applied to the bolt head is well-defined and, in turn, a well-defined, precise tension (pre-load) is induced on the bolt. In addition, there is no damage of the bearing surface even on galvanized or painted surfaces.

Furthermore, the washer allows for an improved (increased) untightening torque, i.e. the torque which has to be applied to the bolt head to untightening the bolt/washer/bearing assembly. This untightening torque is increased in relation to a certain tightening torque applied, i.e. the torque to the bolt head upon tightening the bolt/washer/bearing assembly. Thus, the resistance to loosening the bolt is improved.

The washer of the invention when used in a bolt/washer/bearing assembly which was tightened with a torque of 80 Nm shows an improved ratio of the minimum untightening torque to the tightening torque of higher than 1, higher than 1.2 or even higher than 1.3.

Finally, the bolt/washer/bearing assembly comprising the washer of the invention has an increased residual tension after application of vibrational stress to the assembly. Thus, again the resistance to loosening the bolt is improved.

The serration on the under head surface of the washer comprises a saw tooth structure. The saw teeth are characterized in that in a cross-sectional view of the serration the teeth are asymmetrical with regard to a plane perpendicular to the washer surface going through the highest extension of the saw tooth, i.e. they have a flank with smaller angle (flatter flank) and a flank with a bigger angle (steep flank) with respect to the washer plane. The washer plane is a plane which is parallel to the surfaces of the washer.

The saw teeth are arranged so that they enable rotation in direction of tightening of the bolt (also denoted as tightening direction) more easily than in the untightening rotational direction (also denoted as locking direction), i.e. the under head of the bolt slides on the flatter flanks of the saw teeth when the bolt is tightened. Thus, the friction in the tightening direction is lower than the friction caused in the locking direction.

Preferably, the saw teeth of the saw teeth structure are directly adjacent to each other so that there is no planar section of the washer surface between the saw teeth.

It is preferred that the angle between the flatter flank of the saw teeth and the plane perpendicular to the washer surface going through the highest extension of the saw tooth is from 2 to 20°, more preferably, is from 4 to 15°, and most preferably, is from 6 to 12°.

Furthermore, it is preferred that the angle between the steep flank of the saw teeth and the plane perpendicular to the washer surface going through the highest extension of the saw tooth is from 55 to 75°, more preferably is from 58 to 72°, and most preferably is 60 to 70°.

Preferably, the height of saw teeth, i.e. maximum dimension of the saw teeth in direction perpendicular to the washer plane, is from 0.10 to 0.25 mm, more preferably is from 0.11 to 0.24 mm and most preferably is from 0.12 to 0.23 mm, such as from 0.15 to 0.20 mm.

The total thickness of the washer is the minimum extension of the washer in direction perpendicular to the washer plane, i.e. its extension from the one to the other washer surface not including any teeth protruding from the surfaces.

Preferably, the serration on the under head surface of the washer comprises between 0.8 and 1.2, preferably 0.85 and 1.15 saw teeth per mm of inner circumference of the washer. For example, an M10 washer usually has an inner circumference of about 33.3 mm and the number of saw teeth is 36, so that per mm of inner circumference 1.08 saw teeth are present.

The saw teeth are preferably equally spaced.

Preferably, the extension of each the saw teeth along the inner circumference of the washer (when extended over the chamfer to the inner circumference) is from 0.8 to 1.2 mm, more preferably from 0.85 to 1.15 mm.

The edges of the saw tooth structure in top view of the under head surface of the washer of the invention have a boomerang-like shape, i.e. the edges have a shape with two end sections which are straight, and one curved middle section so that the two straight end sections enclose an angle smaller than 180°. Preferably, the angle is from 100 to 170°, more preferably is from 110 to 140° and most preferably is from 120 to 150°.

The tip of the boomerangs, i.e. the tops of the curved middle sections, point into the untightening direction of the washer, i.e. the edge shape is convex seen from the untightening direction. The untightening (tightening) direction of the washer is the direction in which the washer has to be rotated relative to the bolt head in order to untighten (tighten) the bolt/washer/bearing joint. As usually threaded bolts have to be rotated clockwise to tighten a bolt/washer/bearing joint, the tightening direction of the washer in this case is counterclockwise, and the untightening direction of the washer is clockwise.

Preferably, the tip of the boomerangs are the points of the boomerang shaped edges extending the most into the untightening direction of the washer, i.e. a line radially extending from the center of the washer and tangential to the tip of the boomerang has a positive angle in untightening direction to any line radially extending from the center of the washer and tangential to any other point of the boomerang shaped edge.

The "boomerang" shape does not need to be symmetrical, i.e. the two end sections may have different length.

In a preferred embodiment, the straight end section of the edge closer to the outer circumference of the washer will have a length of 35 to 45% of the total length of the edge, the curved section will have a have a length of 35 to 45% of the total length of the edge, and the straight section closer to the inner circumference of the washer will have a length of 10 to 30% of the total length of the edge.

Preferably, the end of the inner straight section of the boomerang shaped edge in direction to the inner circumference and the end of the outer straight section of the boomerang shaped edge in direction to the outer circumference lie both on a line extending radially from the center of the washer.

The washer according to the invention preferably comprises a beveled portion (chamfer) on the inner periphery of the bolt under head engaging surface.

The beveled portion, on the one hand, avoids an interference of the inner part of the under head engaging surface of the washer with a thickened part of the shaft, which is usually present where the bolt under head is connected to the shaft of the bolt, is avoided and, on the other hand, it allows the user to more easily determine which surface of the washer should be applied to the bolt head and which one to the bearing.

The washer may or may not include a beveled portion (chamfer) also on the outer periphery of the under head surface.

Preferably, the beveled portion makes up at most 30% of the width of the washer surface, preferably at most 20% of the width of the washer surface.

The width of washer is defined to be the radial extension of the washer from its inner to its outer circumference.

The chamfer preferably has a planar surface.

Furthermore, the beveled section forms an angle with the washer surface of from 20 to 70°, more preferably from 30 to 60°, and most preferably of from 35 to 49°, such as e.g. 45°.

The chamfer preferably penetrates to a depth into the washer of up to 50% of the washer thickness, more preferably of up to 40%, and most preferably of up to 30%.

Preferably, the boomerang shaped saw teeth are present on the entire width of the washer surface which is not beveled.

The serration on the bearing engaging surface (bearing surface) of the washer of the invention comprises a plurality of teeth which in top view of the bolt under head engaging surface run in the direction from the inner to the outer circumference of the washer surface and which are inclined with regard to radially extending straight lines originating from the washer center.

The teeth are inclined with regard to radially extending straight lines originating from the washer center so that the end of the teeth in width direction, which are close to the inner circumference of the washer, point into the tightening direction.

Preferably, the angle of inclination defined as being the angle between radially extending straight lines originating from the washer center and the teeth in top view of the washer bearing surface is from 40 to 80°, more preferably from 50 to 70°, and most preferably from 55 to 65°, such as e.g. 60°.

The teeth preferably have straight shape in top view of the washer bearing surface.

The teeth are preferably constructed so that the teeth at a position which is offset by an amount of 0.2 to 0.3, more preferably of 0.23 to 0.27, such as e.g. 0.25, of the outer washer diameter from a straight line radially extending through washer center is parallel to said straight line.

While there may be sections of the bearing surface of the washer in widthwise direction to which the teeth do not extend, it is preferred that the teeth extend fully from inner to outer circumference of the washer surface.

Preferably, the teeth are designed so that they have a symmetrical shape with regard to the direction perpendicular to the washer plane in cross-sectional view of the teeth. Thus, the friction caused by the teeth upon relative rotation of the bearing surface to the bearing is the same both rotational directions.

Preferably, the angle between the flanks of the teeth in cross-sectional view of the teeth and the washer plane is from 35 to 65°, more preferably from 40 to 60°, and most preferably from 45 to 55°, such as, e.g. 50°.

Preferably, the height of the teeth, i.e. maximum dimension of the teeth in direction perpendicular to the washer plane, is from 0.10 to 0.25 mm, more preferably is from 0.11 to 0.24 mm and most preferably is from 0.12 to 0.23 mm, such as from 0.15 to 0.20 mm.

Furthermore, preferably the teeth are not directly adjacent to each other but between the teeth are planar sections.

The number of teeth present in the bearing surface is preferably between 1.6 and 2.0, more preferably from 1.7 to 1.9 per mm of inner circumference of the washer. For example, an M10 washer usually has an inner circumference of about 33.3 mm and the number of teeth is 60, so that per mm of inner circumference 1.8 teeth are present.

Preferably, the washer does not have a beveled portion on the inner periphery of its bearing surface.

In the washer of the invention, the top sections of the edges of both the saw teeth on the under head surface and the teeth on the bearing surface seen in cross-sectional view of the teeth are rounded.

Thus, no acute edges of the washer patterns extend towards and, upon tightening, engage with the surfaces of the under head and the bearing.

It is preferred that the rounded section makes up 30% to 70% of the total height of the teeth, more preferably 40 to 60% and most preferably 45 to 45%, such as 50%.

The radius of the rounded top section of the teeth on the bearing surface preferably is from 0.05 to 0.20 mm, more preferably is from 0.07 to 0.18 mm, and most preferably is from 0.08 to 0.16 mm.

The radius of the rounded top section of the saw teeth on the under head surface preferably is from 0.10 to 0.40 mm, more preferably is from 0.12 to 0.35 mm, and most preferably is from 0.17 to 0.32 mm.

Furthermore, it is preferred that also the section between the steep flanks of the saw teeth and the washer surface is rounded. Preferably, the radius is smaller than 0.15 mm, more preferably smaller than 0.12 mm.

Preferably, the washer has a superficial hardness of 450 to 620 HV, more preferably of 470 to 600 HV, still more preferably of 490 to 580 HV, and most preferably of 510 to 560 HV.

Furthermore, preferably the core of the washer has a hardness of 450 to 620 HV, more preferably of 470 to 600 HV, still more preferably of 490 to 580 HV, and most preferably of 510 to 560 HV.

All Vickers ("HV") hardnesses mentioned herein are measured according to ISO 6507-1, year 2000 edition, with a proof load of 10 kg.

To the washer, different surface treatments may be applied, such as, e.g., Delta Protect KL120.

The washer of the invention usually has a flat shape, i.e. the washer surfaces are parallel to a plane comprising the washer and its center.

However, the washer may also have a conical shape i.e. the washer surfaces are parallel to a cone with its axis going through the center of the washer. The "washer plane" as mentioned hereinabove is then a tangential plane to the washer surface.

The invention is further illustrated by reference to the following examples be reference to the figures, wherein.

In the figures, the reference numbers denote:
1: the washer #1
2: washer center
3: central hole of the washer
4: under head surface
5: inner circumference
6: outer circumference
7: saw tooth
8: chamfer
9: outer circumference of chamfer
10: edge of saw tooth
11: steep flank of saw tooth
12: flatter flank of saw tooth
13: section where steep flank end at washer surface
14: bearing surface
15: tooth
16: flank of tooth
17: top section of tooth
18: top section of saw tooth
19: inner straight end section of saw tooth edge
20: curved middle section of saw tooth edge
21: outer straight section of saw tooth edge
22: washer #3
23: under head surface of washer #3
24: saw tooth edge of washer #3
25: bearing surface of washer #3
26: tooth of washer #3
27: center of washer #3.

Figure 1:
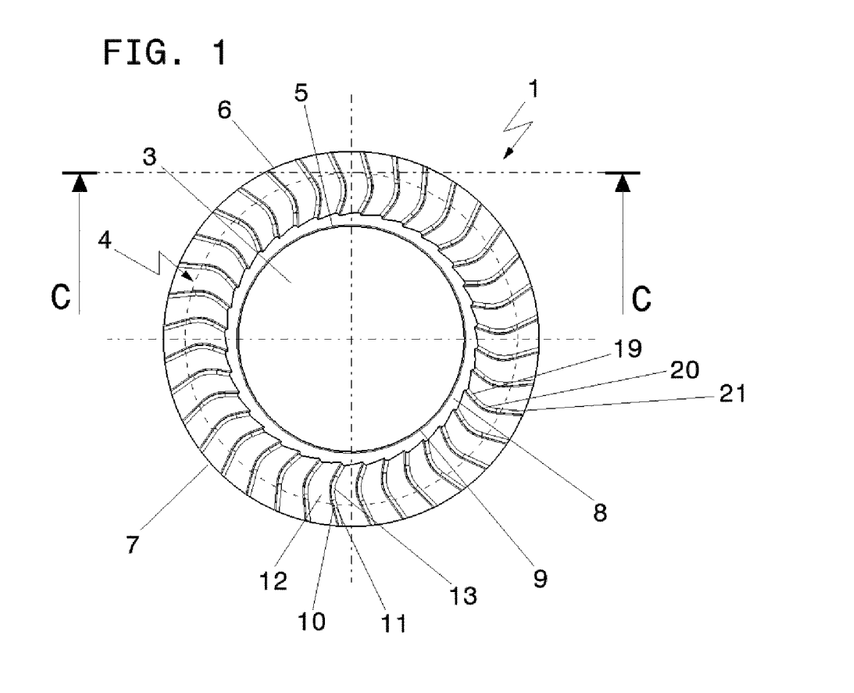
FIG. 1 shows the serration pattern of an embodiment of the washer (washer #1) according to the invention in size M10 on the surface supposed to engage with the bolt under head (under head surface) in top view, FIG. 2A) shows a cross section of washer 1 along line C-C in FIG. 1 and FIG. 2B) shows an enlarged section thereof.
Figure 2:
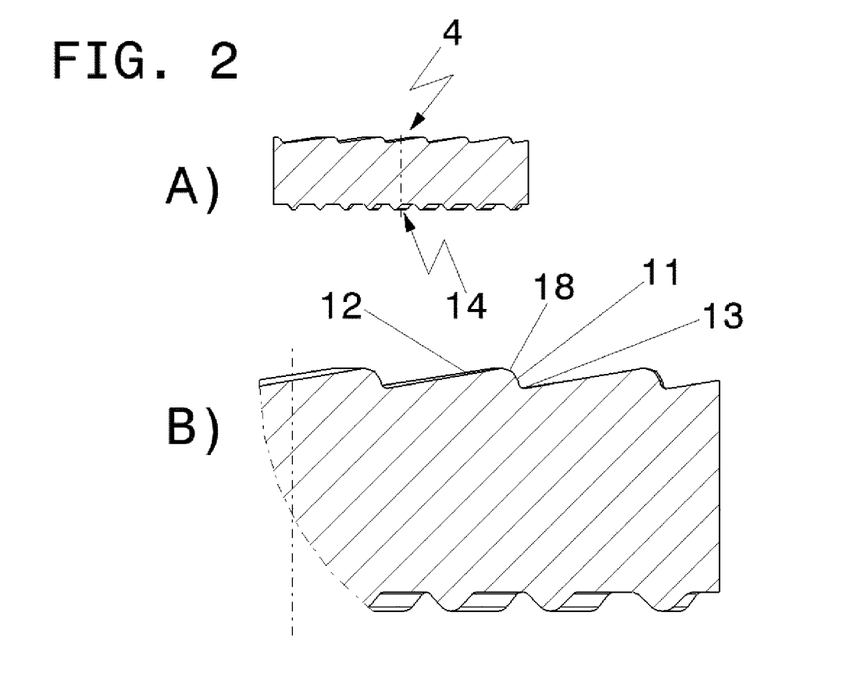

In FIGS. 1 to 6 different views of an embodiment of the washer 1 of the invention in M10 (washer #1) are shown. Washer #1 (and also washer #3) are supposed to be used in a bolt/washer/bearing assembly which is tightened by rotating the bolt head clockwise relative to the washer. Thus, the tightening direction of the washer #1 (and #3) is counter-clockwise rotation, and the untightening direction is clockwise rotation relative to the bolt head. FIG. 1 shows the under head surface 4 of the washer 1. The washer diameter from the inner 5 to the outer circumference 6 is from 17.4 to 17.7 mm. The inner diameter defining the central hole 3 of the washer through which the shaft of a bolt to be fastened to a bearing extends is from 10.5 to 10.7 mm. The width of the washer is, accordingly, from 3.35 to 3.6 mm.

The thickness of the washer is from 2.25 to 2.5 mm.

As can further be seen from FIG. 1, on the under head surface 4 a saw teeth structure with boomerang shaped edges 10 is present which extends from the outer circumference 6 of the washer to the outer circumference of the chamfer 8. Chamfer 8 is present from the inner circumference of the washer 5 to 0.6 to 0.7 mm in direction to the outer circumference 6. As can be seen from FIG. 5, the chamfer 8 penetrates by 0.6 to 0.7 mm into the washer thickness direction. The angle with the washer plane is 45°, and the chamfer surface is planar.

The boomerang shaped edge is formed by an inner straight end section 19, a curved middle section 20, which points into the untightening direction of the washer, and an outer straight end section 21.

In enlarged side view in FIG. 2B) the cross section of saw teeth 7 is shown, including a steep flank 11 and a flatter flank 12. Top section 18 of the saw teeth 7 is rounded with a radius of 0.17 to 0.23 mm. Also the section between the steep flanks of the saw teeth and the washer surface 13 is rounded, the maximum radius is 0.10 mm.

Figure 3:
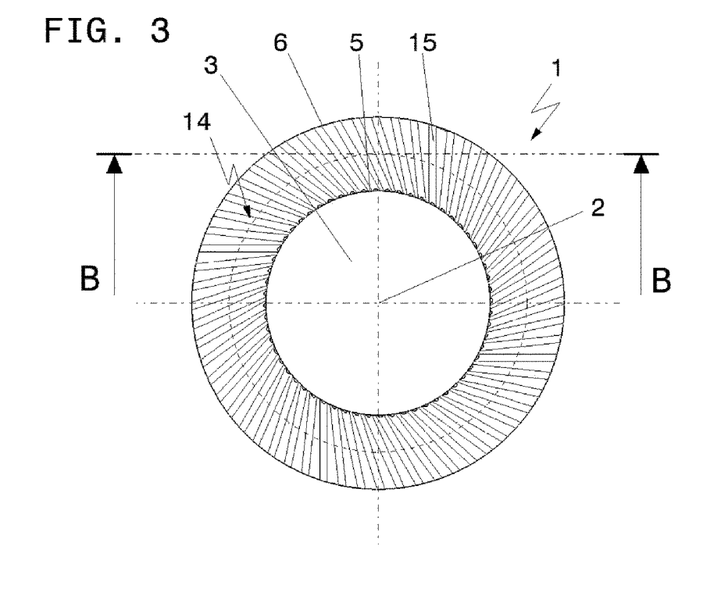
FIG. 3 shows the serration pattern of washer #1 on the surface supposed to engage with the bearing in top view, FIG. 4A) shows another cross section of washer #1 along line B-B in FIG. 3 and FIG. 4B) shows an enlarged section thereof.
Figure 4:
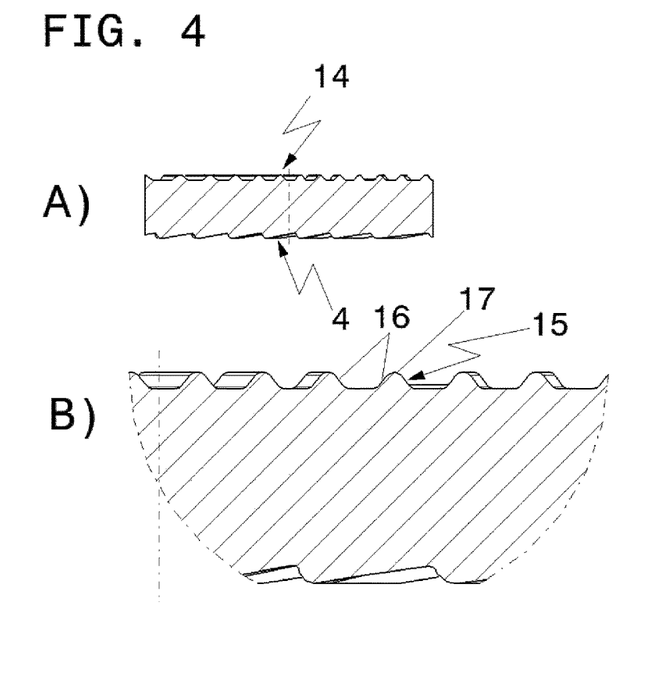
Figure 5:
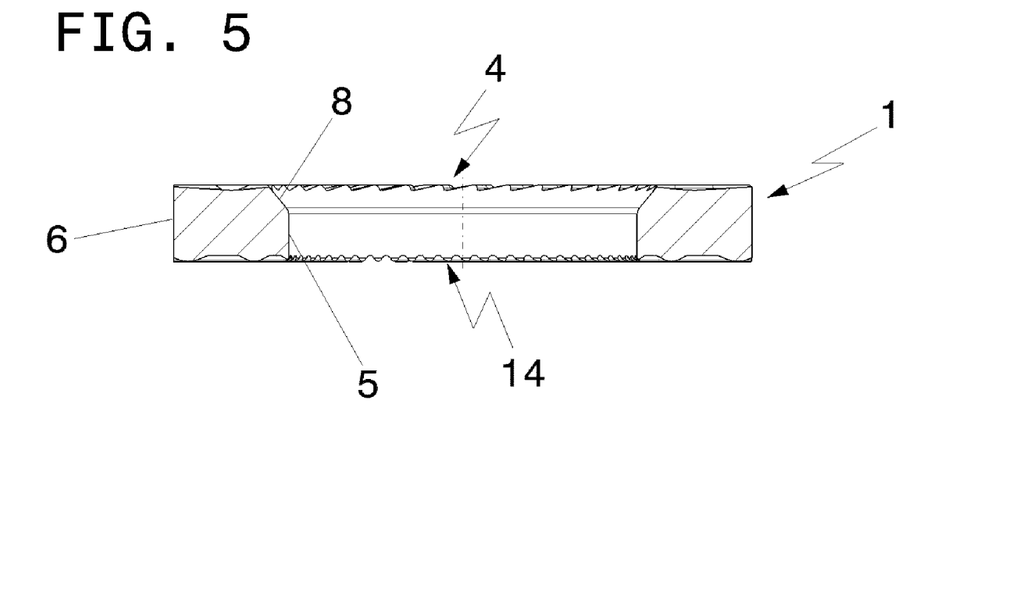
FIG. 5 shows a cross sectional view of washer #1, FIGS. 6A) and B) show perspective views of the under head and bearing surface of washer #1, respectively.
Figure 6:
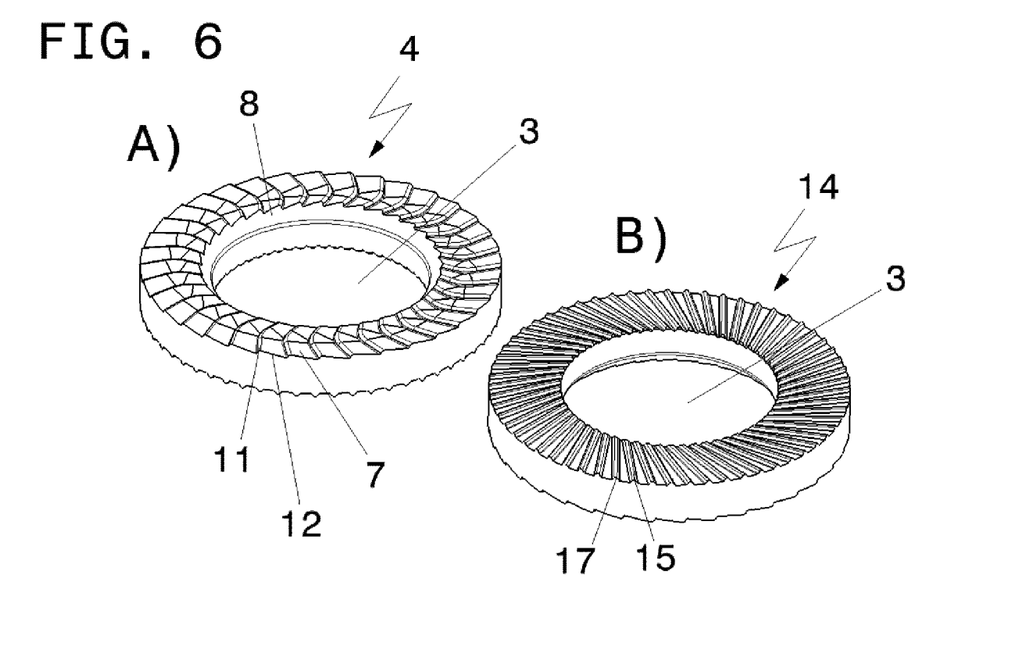

In FIG. 3 the bearing surface 14 of washer 1 is shown. The tightening direction here is the clockwise direction, and the untightening direction is counter-clockwise, seen with regard to a relative movement of the bolt head.

The teeth 14 have a straight shape and are present on the whole width of the washer surface extending from the inner 5 to the outer circumference 6 of the washer 1. The teeth are inclined by 60° with regard to radially extending straight lines originating from the washer center 2.

As can be seen from enlarged side view in FIG. 4B, the teeth 14 have an approximately triangular shape with the angle of the flanks of the teeth to the washer plane being 60°. The top section of the teeth, which starts at 50% of the teeth's height, is rounded with a radius of 0.08 to 0.12 mm.

Perspective views of the washer #1 under head surface 4 and bearing surface 14 are shown in FIG. 6A and FIG. 6B, respectively.

Figure 7:
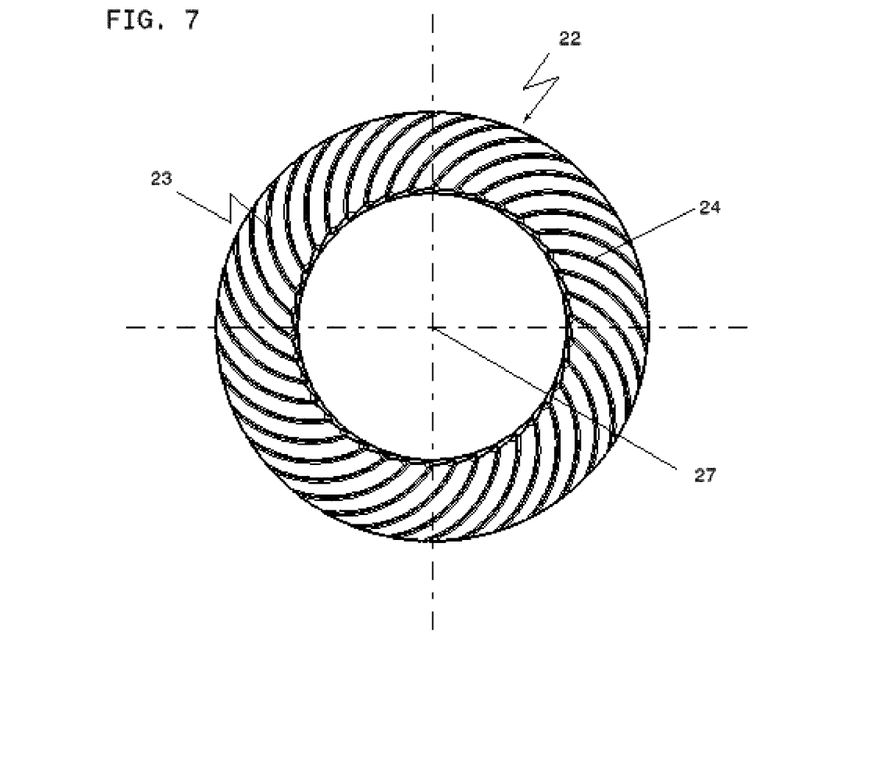
FIG. 7 shows the serration on the under head surface of washer #3 (comparative)

In FIG. 7, the under head surface 23 of comparative washer #3 22 is shown. As can be seen, the serration on that surface 23 has a saw teeth structure similar to washer #1 and in the tested washer #3 the saw teeth had the same height as that of washer #1. However, the edges of the saw teeth 24 had an entirely curved shape and hence were shaped differently from the boomerang shape of the saw teeth edges of washer #1.

Figure 8:
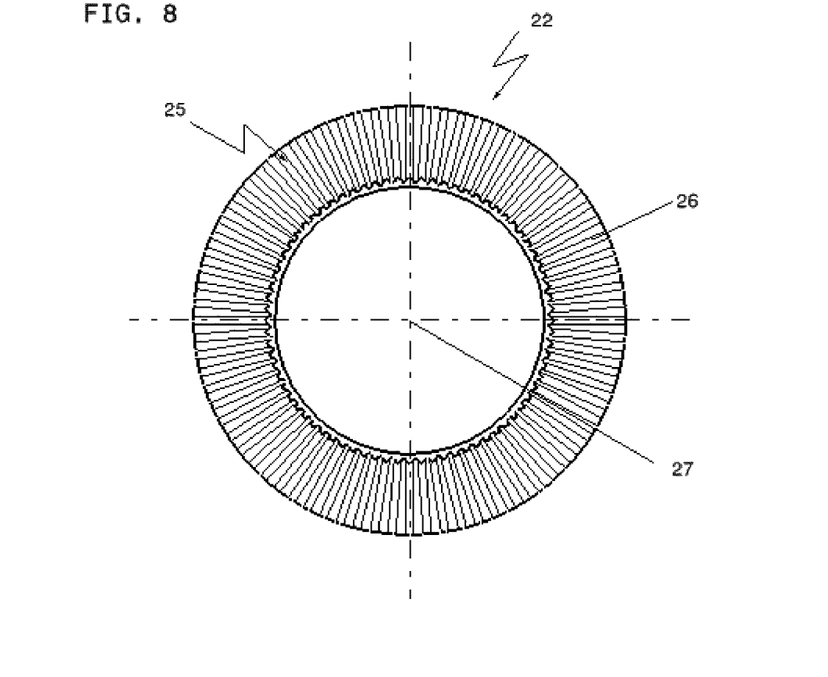
FIG. 8 shows the serration on the bearing surface of washer #3 (comparative).

In FIG. 8, the bearing surface 25 of comparative washer #3 22 is shown. As can be seen, the serration on that surface 25 has a teeth structure similar to washer #1 and in the tested washer #3 the teeth had the same height as that of washer #1. However, the edges of the teeth 25 did not shown an inclination with regard to radially extending lines from the washer center 27 and hence the teeth structure was different from the teeth structure of washer #1.

EXAMPLES

Three different washers were tested as regards their performance against the loosening of a bolted joint connection.

The tested washers were:

Washer #1 (invention): The washer (M10) according to the invention as displayed in FIGS. 1 to 6 and described in the relating text above, Washer #2 (comparative): Commercial washer "RIPP-LOCK" lock washer produced by Bölhoff (M10), and Washer #3 (comparative): washer (M10) as displayed in FIGS. 7 and 8, which is similar to the washer disclosed in DE 28 11 108 A1.

The following test methods were applied:

Test #1): Mechanical functional test with bearing surface hardness steel of 100 HV-200 HV-300 HV-Aluminum. This lab bench test was performed using plates of different materials and hardness, to tighten together and afterwards untighten a bolted join connection made of a screw, a nut and the tested washer. The goal of this test is to simulate the "static" application of a bolted join connection.

With this test it can also be checked if the washer slides on the bearing surface during the bolt tightening or untightening.

The following testing conditions were applied: Tightening torque ("Tt")=80 Nm, bolt+nut+washer zinc-flake coated, 10 samples tested in each test. The results are given in Table 1 below, wherein "$Tu_{min}$" denotes the minimum untightening torque, "$Tu_{max}$" denotes the maximum untightening torque, and ratio "$Tu_{min}/Tt$" denotes the ratio between the minimum untightening torque and the tightening torque.

Test #2): Dynamic test of the locking fastener under transverse loading conditions according to DIN 65151 and DIN 25201 part 4 (vibration test). The goal of this test is to simulate the behavior of a bolted joint connection in a "dynamic" application in presence of vibrations.

The following testing conditions were applied: Junker test 2000 vibration cycles, bolt grade 10.9, bolt+nut+washer zinc-flake coated, 21.2 kN preload, bearing surface hardness: 200 HV, frequency: 12.5 Hz.

The results are given in Table 2 below.

TABLE 1

|  | Washer #1 | | | Washer #2 | | | Washer #3 | | |
| --- | --- | --- | --- | --- | --- | --- | --- | --- | --- |
|  | $Tu_{min}$ [Nm] | $Tu_{max}$ [Nm] | ratio $Tu_{min}/Tt$ | $Tu_{min}$ [Nm] | $Tu_{max}$ [Nm] | ratio $Tu_{min}/Tt$ | $Tu_{min}$ [Nm] | $Tu_{max}$ [Nm] | ratio $Tu_{min}/Tt$ |
| 100 HV | 108 | 126 | 1.35 | 60 | 66 | 0.75 | 74 | 88 | 0.93 |
| 200 HV | 115 | 129 | 1.44 | 58 | 65 | 0.73 | 76 | 98 | 0.95 |
| 300 HV | 108 | 128 | 1.35 | 51 | 60 | 0.64 | 72 | 96 | 0.90 |
| Aluminum | 109 | 125 | 1.36 | 61 | 70 | 0.76 | 66 | 89 | 0.83 |
| State of the pieces after the test | Presence of zinc coating residues | | | Presence of zinc coating residues | | | Presence of chips of metal burrs and zinc coating residues | | |
| Sliding of the washer on the bearing surface | No sliding | | | 70% of the washers slide | | | 100% of the washers slide | | |

TABLE 2

| | Washer #1 | | Washer #2 | | Washer #3 | |
| --- | --- | --- | --- | --- | --- | --- |
| | Min residual tension after 2000 cycles [N] | MAX residual tension after 2000 cycles [N] | Min residual tension after 2000 cycles [N] | MAX residual tension after 2000 cycles [N] | Min residual tension after 2000 cycles [N] | MAX residual tension after 2000 cycles [N] |
| | 16.2 | 18.9 | Failed after 200 cycles | Failed after 550 cycles | 15.9 | 17.8 |

The invention claimed is:

1. Washer having a having central hole, a bolt under head engaging surface and a bearing engaging surface with a serration on both surfaces, wherein the serration on the bolt under head engaging surface comprises a saw tooth structure, the edges of the saw tooth structure in top view of the bolt under head engaging surface of the washer have a boomerang shape with the tip of the boomerangs pointing into the untightening direction of the washer, the serration on the bearing engaging surface comprises a plurality of teeth which in top view of the bearing engaging surface run in the direction from the inner to the outer circumference of the bearing engaging surface and which are inclined with regard to radially extending straight lines originating from the washer center so that the ends of the teeth close to the inner circumference of the washer point into the tightening direction, and the top sections of both the teeth and the saw teeth in cross-sectional view of the serrations are rounded.

2. Washer according to claim 1 wherein the bolt under head engaging surface has a chamfer on its inner periphery.

3. Washer according to claim 1 wherein the saw teeth of the saw teeth structure are directly adjacent to each other so that there is no planar section of the bolt under head engaging surface between the saw teeth.

4. Washer according to claim 1 wherein the angle between the flatter flank of the saw teeth and the plane perpendicular to the bolt under head engaging surface going through the highest extension of the saw teeth is from 2 to 20°.

5. Washer according to claim 1 wherein the angle between the steep flank of the saw teeth and the plane perpendicular to the bolt under head engaging surface going through the highest extension of the saw teeth is from 55 to 75°.

6. Washer according to claim 1 wherein the height of the saw teeth is from 0.10 to 0.25 mm.

7. Washer according to claim 1 wherein the serration on the bolt under head engaging surface of the washer comprises between 0.8 and 1.2 saw teeth per mm of inner circumference of the washer.

8. Washer according to claim 1 wherein the two straight end sections of the boomerang shaped edges of the saw teeth structure enclose an angle from 100 to 170°.

9. Washer according to claim 1 wherein the angle of inclination defined as being the angle between radially extending straight lines originating from the washer center and the teeth in top view of the bearing engaging surface is from 40 to 80°.

10. Washer according to claim 4 wherein the teeth have straight shape in top view of the bearing engaging surface.

11. Washer according to claim 1 wherein the teeth are constructed so that the teeth at a position which is offset by an amount of 0.2 to 0.3 of the outer washer diameter from a straight line radially extending through the washer center is parallel to said straight line.

12. Washer according to claim 1 wherein the teeth are designed so that they have a symmetrical shape with regard to the direction perpendicular to the washer plane in cross-sectional view of the teeth.

13. Washer according to claim 1 wherein the height of the teeth is from 0.10 to 0.25 mm.

14. Washer according to claim 1 wherein the angle between the flanks of the teeth in cross-sectional view of the teeth and the washer plane is from 35 to 65°.

15. Washer according to claim 1 wherein the rounded section makes up 30% to 70% of the total height of the teeth.

* * * * *